US009587441B2

(12) United States Patent
Logan et al.

(10) Patent No.: US 9,587,441 B2
(45) Date of Patent: Mar. 7, 2017

(54) APPARATUS AND METHOD FOR COAXIALLY JOINING COMPONENTS TO RESIST RELATIVE ROTATIONAL AND LONGITUDINAL MOVEMENT

(71) Applicant: Evolution Engineering Inc., Calgary (CA)

(72) Inventors: Aaron W. Logan, Calgary (CA); David A. Switzer, Calgary (CA); Patrick R. Derkacz, Calgary (CA); Justin C. Logan, Calgary (CA); Daniel W. Ahmoye, Calgary (CA); Darcy A. Downs, Calgary (CA); Mojtaba Kazemi Miraki, Calgary (CA)

(73) Assignee: Evolution Engineering Inc., Calgary (CA)

(*) Notice: Subject to any disclaimer, the term of this patent is extended or adjusted under 35 U.S.C. 154(b) by 0 days.

(21) Appl. No.: 14/439,599

(22) PCT Filed: Nov. 1, 2012

(86) PCT No.: PCT/CA2012/001012
§ 371 (c)(1),
(2) Date: Apr. 29, 2015

(87) PCT Pub. No.: WO2014/066972
PCT Pub. Date: May 8, 2014

(65) Prior Publication Data
US 2015/0292274 A1 Oct. 15, 2015

(51) Int. Cl.
*E21B 17/042* (2006.01)
*F16L 15/08* (2006.01)
(Continued)

(52) U.S. Cl.
CPC .......... *E21B 17/042* (2013.01); *E21B 17/003* (2013.01); *E21B 17/028* (2013.01);
(Continued)

(58) Field of Classification Search
CPC .... E21B 17/003; E21B 17/028; E21B 17/042; E21B 47/122; F16L 25/021; F16L 15/08; F16L 15/04
See application file for complete search history.

(56) References Cited

U.S. PATENT DOCUMENTS 3,047,316 A * 7/1962 Wehring ............... E21B 17/042
                                                         285/334
3,504,936 A * 4/1970 Brown .................... E21B 17/07
                                                         175/321
(Continued)

FOREIGN PATENT DOCUMENTS

WO          94/05893 A1    3/1994
WO     WO 2011049573 A1 *  4/2011 ........... E21B 17/003

OTHER PUBLICATIONS

Chinese Office Action (with partial English translation), dated Jun. 8, 2016, from Chinese Application No. 201280076846.2.

*Primary Examiner* — Shane Bomar
(74) *Attorney, Agent, or Firm* — Seed Intellectual Property Law Group LLP

(57) ABSTRACT

A method and apparatus for joining first and second bodies coaxially together to resist relative axial and rotational movement between the bodies. A male portion of the first body is received in a complementary female portion of the second body, and the male and female portions are aligned axially on a common axis such that respective cooperating grooves in opposing cylindrical or tapered complementary surfaces of the male and female portions are aligned to form a plurality of passageways or a passageway having a plurality of passageway portions, between the opposing cylin- (Continued)

drical or tapered complementary surfaces. At least two of the passageways or at least two of the passageway portions are disposed at different angles to the common axis. Solid mechanical coupling elements are loaded into each passageway or into the passageway having the plurality of passageway portions, such that each passageway or the passageway having the plurality of passageway portions is substantially full of the solid mechanical coupling elements.

34 Claims, 14 Drawing Sheets

(51) Int. Cl.
| | |
|---|---|
| *F16L 15/04* | (2006.01) |
| *E21B 17/00* | (2006.01) |
| *F16B 17/00* | (2006.01) |
| *E21B 17/02* | (2006.01) |
| *F16L 15/00* | (2006.01) |
| *F16L 21/00* | (2006.01) |
| *F16L 25/02* | (2006.01) |
| *E21B 47/12* | (2012.01) |

(52) U.S. Cl.
CPC .......... *E21B 47/121* (2013.01); *F16B 17/004* (2013.01); *F16L 15/00* (2013.01); *F16L 15/04* (2013.01); *F16L 15/08* (2013.01); *F16L 21/00* (2013.01); *F16L 25/021* (2013.01)

(56) References Cited

U.S. PATENT DOCUMENTS

| | | | | |
|---|---|---|---|---|
| 4,496,174 | A * | 1/1985 | McDonald | E21B 17/003 285/330 |
| 5,749,605 | A * | 5/1998 | Hampton, III | F16L 25/021 285/333 |
| 6,572,152 | B2 * | 6/2003 | Dopf | F16L 25/021 285/330 |
| 7,252,160 | B2 * | 8/2007 | Dopf | E21B 17/003 166/242.6 |
| 7,387,167 | B2 * | 6/2008 | Fraser | E21B 17/028 166/242.1 |
| 8,251,160 | B2 | 8/2012 | Gopalan et al. | |
| 2008/0191900 | A1 | 8/2008 | Camwell et al. | |
| 2009/0280912 | A1 | 11/2009 | Buchanan et al. | |
| 2012/0085583 | A1 | 4/2012 | Logan et al. | |

* cited by examiner

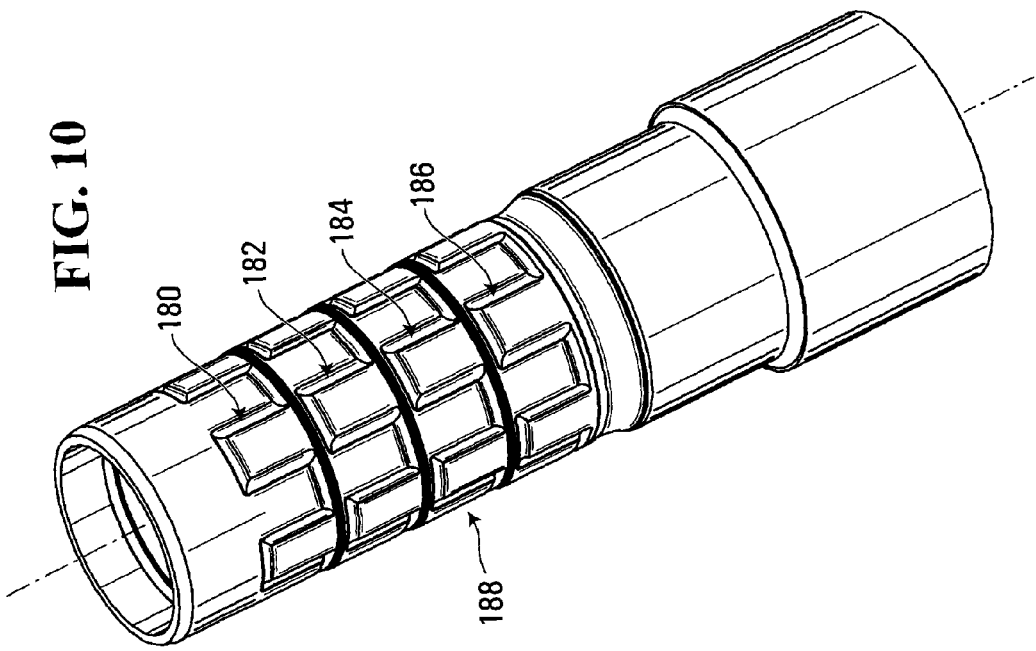
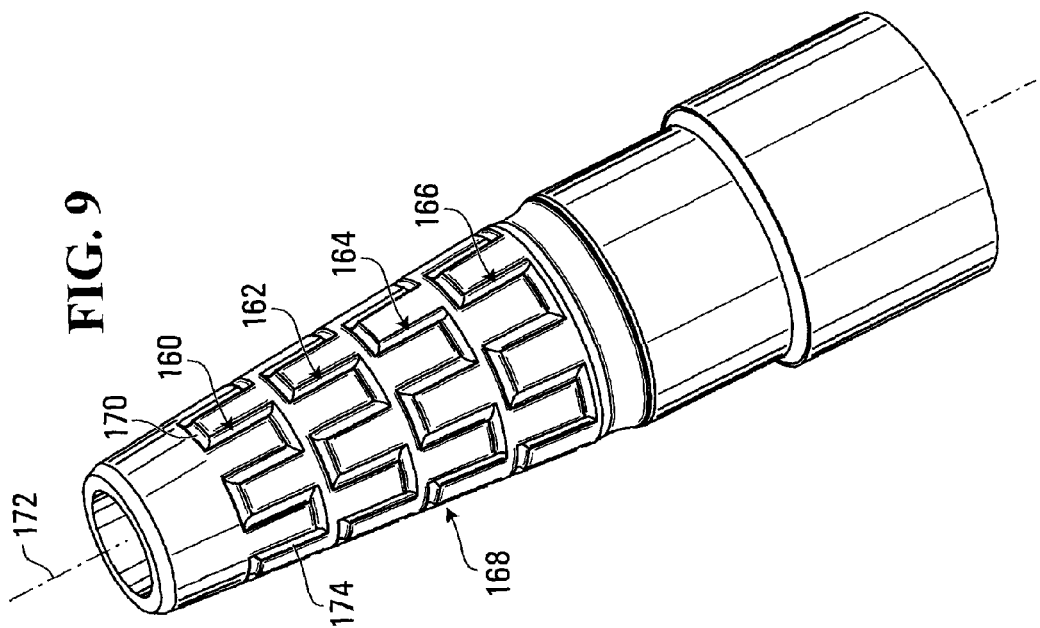

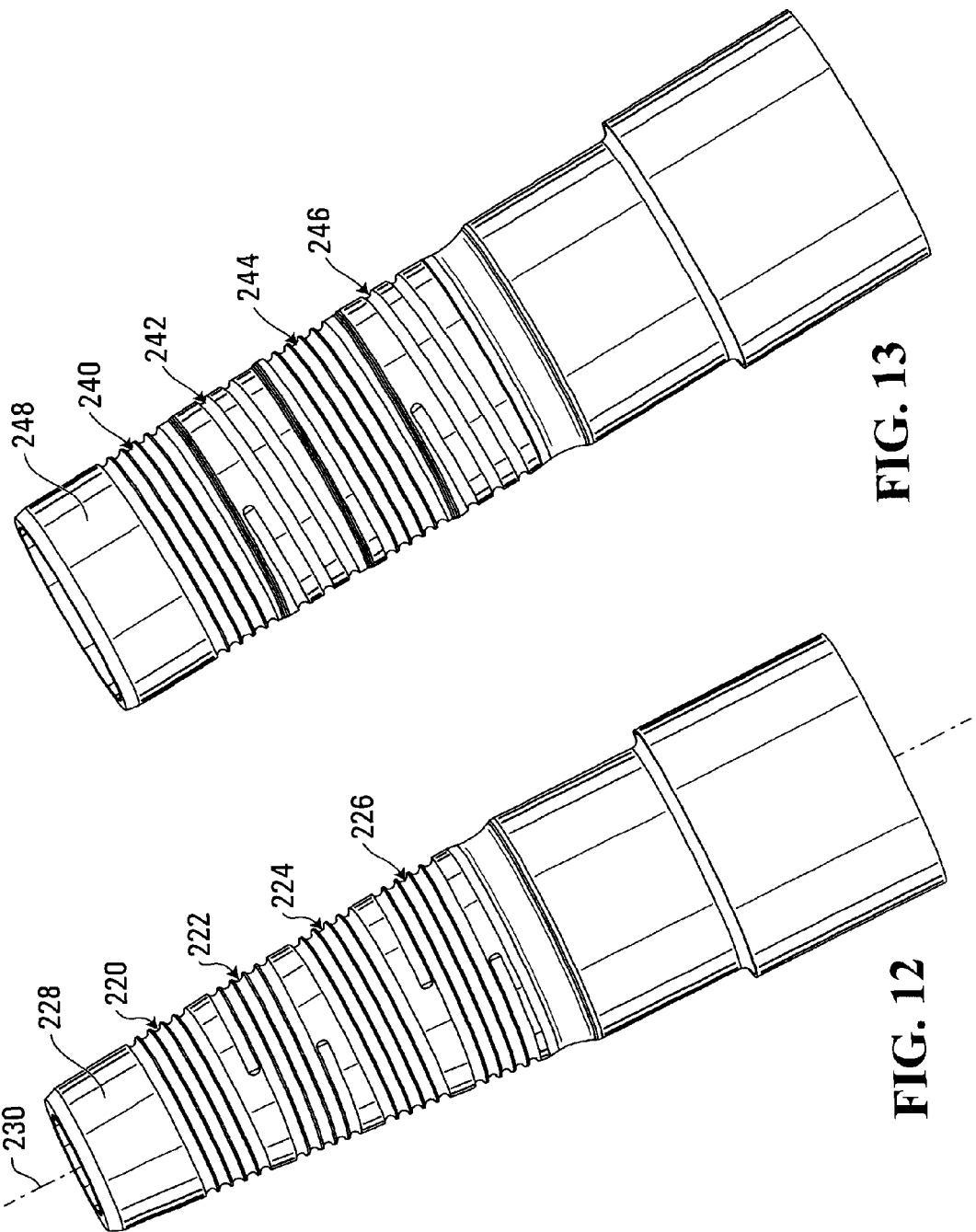

APPARATUS AND METHOD FOR COAXIALLY JOINING COMPONENTS TO RESIST RELATIVE ROTATIONAL AND LONGITUDINAL MOVEMENT

BACKGROUND OF THE INVENTION

1. Field of Invention

This invention relates to a coaxial coupling apparatus for coupling two bodies together along an axis to prevent relative rotational and axial movement of the bodies. It may be particularly advantageous on a downhole bore assembly, and more particularly on a gap sub member thereof.

2. Description of Related Art

In many fields it is necessary to couple two bodies together axially such that the bodies remain axially aligned and are prevented from relative rotational and axial movement. This is particularly true in downhole bore equipment such as a downhole bore assembly and more particularly in a gap sub component thereof where it is necessary to electrically isolate first and second portions of a drill string so that such portions can be used as opposite poles of an antenna to transmit signals into the earth for reception by a receiver located farther up or down the drill string or for reception by surface-based signal detection equipment.

Conventional technologies for connecting together two portions of a gap sub that may be connected to respective opposite portions of a drill string may involve the use of opposing grooves in complementary portions of the gap sub that form a screw thread of constant pitch. The thread may be somewhat loosely filled with ceramic balls held in place by a thermoplastic material, for example. The ceramic balls mechanically couple the complementary portions together to prevent relative longitudinal movement of the complementary portions, but relative rotational movement is impeded only by the thermoplastic material. This places severe reliance on the integrity of the thermoplastic material to prevent rotational movement. Such reliance can be dangerous because the thermoplastic material is significantly weaker at elevated temperatures and can be somewhat susceptible to fatigue and degradation due to temperature cycling, corrosive fluids and mechanical fatigue when used in a downhole bore environment.

SUMMARY OF THE INVENTION

In accordance with one aspect of the invention, there is provided a method of joining first and second bodies coaxially together to resist relative axial and rotational movement between the bodies. The method involves receiving a male portion of the first body in a complementary female portion of the second body, and aligning the male and female portions axially on a common axis such that respective cooperating grooves in opposing cylindrical or tapered complementary surfaces of the male and female portions are aligned to form a plurality of passageways or a passageway having a plurality of passageway portions, between the opposing cylindrical or tapered complementary surfaces, at least two of the passageways or at least two of the passageway portions being disposed at different angles to the common axis. The method further involves loading solid mechanical coupling elements into each passageway or into the passageway having the plurality of passageway portions, such that the each passageway or the passageway having the plurality of passageway portions is substantially full of the solid mechanical coupling elements.

Loading the solid mechanical coupling elements may involve loading spherical or ellipsoid-shaped coupling elements into respective ones of the passageways or into the passageway having the plurality of passageway portions.

Loading the spherical or ellipsoid shaped coupling elements may involve admitting the spherical or ellipsoid-shaped coupling elements into respective conduits formed in the female portion between an outer surface of the female portion and respective ones of the cooperating grooves formed in the opposing cylindrical or tapered complementary surface of the female portion defining respective ones of the passageways or into a conduit formed in the female portion between an outer surface of the female portion and the cooperating groove formed in the opposing cylindrical or tapered complementary surface of the female portion defining the passageway having the plurality of passageway portions.

The solid mechanical coupling elements may include an insulating material.

The solid mechanical coupling elements may include ceramic material.

The opposing cylindrical or tapered complementary surfaces of the male and female portions may be spaced apart and define a space between the opposing cylindrical or tapered complementary surfaces of the male and female portions and adjacent each passageway or adjacent the passageway portions of the at least one passageway having the passageway portions, such space being in communication with each passageway or the passageway having the plurality of passageway portions.

The method may further involve injecting a curable filler material into the space to fill the space to inhibit fluid ingress between the opposing cylindrical or tapered complementary surfaces of the male and female portions and the solid mechanical coupling elements.

The solid mechanical coupling elements may include an electrically insulating material and the curable filler material may include a thermoplastic electrically insulating material for electrically insulating the male and female portions from each other.

The cooperating grooves may define at least one passageway encircling the common axis, and such that the at least one passageway may have a varying pitch.

The cooperating grooves may define a plurality of separate passageways encircling the common axis wherein at least two of the separate passageways may have a different pitch.

The cooperating grooves may define a plurality of separate passageways encircling the common axis wherein at least two of the separate passageways may have opposing pitch.

The cooperating grooves may define a plurality of separate passageways, and at least one of the separate passageways may be disposed at a right angle to the common axis.

The cooperating grooves may define a plurality of separate passageways, and at least one of the separate passageways may be aligned with the common axis.

The cooperating grooves may define a plurality of separate passageways, and each passageway may have at least one portion disposed at a right angle to the common axis.

The cooperating grooves may define a plurality of separate passageways, and each passageway may have at least one portion aligned with the common axis.

The cooperating grooves may define a plurality of irregularly positioned separate passageways, and each irregularly positioned separate passageway may have portions disposed at different angles to the common axis.

The female portion may be a female gap sub member of a downhole bore assembly and the male portion may be a male gap sub member of the downhole bore assembly. The method may involve positioning an electromagnetic energy transmitter or receiver within the male and female gap sub members. The method may further involve causing a first contact of the transmitter or receiver to make electrical contact with the female portion of the gap sub member and causing a second contact of the transmitter or receiver to make electrical contact with the male portion of the gap sub member such that the transmitter or receiver can transmit or receive electromagnetic energy through the earth, between the female and male gap sub members and a remotely located receiver or transmitter.

In accordance with another aspect of the invention, there is provided a coaxial coupling apparatus. The apparatus includes a first body having a male coupling portion, and a second body having a female coupling portion complementary in shape to the male portion, the male and female portions being aligned axially on a common axis. The male and female coupling portions have opposing cylindrical or tapered complementary surfaces having respective cooperating grooves that are aligned to form a plurality of passageways or a passageway having a plurality of passageway portions, between the opposing cylindrical or tapered complementary surfaces. At least two of the passageways or at least two of the passageway portions are disposed at different angles to the common axis. The apparatus further includes a plurality of solid mechanical coupling elements disposed in each passageway of the plurality of passageways or in the passageway having the plurality of passageway portions, such that the each passageway of the plurality of passageways or the passageway having the plurality of passageway portions is substantially full of the solid mechanical coupling elements.

The solid mechanical coupling elements may include spherical or ellipsoid-shaped coupling elements in respective ones of the passageways or in the passageway having the plurality of passageway portions.

The apparatus may include respective conduits formed in the female portion between an outer surface of the female portion and respective cooperating grooves formed in the opposing cylindrical or tapered complementary surface of the female portion defining respective ones of the passageways or into a conduit formed in the female portion between an outer surface of the female portion and the cooperating groove formed in the opposing cylindrical or tapered complementary surface of the female portion defining the passageway having the plurality of passageway portions.

The solid mechanical coupling elements may include an insulating material.

The solid mechanical coupling elements may include ceramic material.

The opposing cylindrical or tapered complementary surfaces of the male and female portions may be spaced apart and may define a space between the opposing cylindrical or tapered complementary surfaces of the male and female portions and adjacent each passageway or adjacent the passageway portions of the at least one passageway having the passageway portions, such space being in communication with each passageway or the passageway having the plurality of passageway portions. The apparatus may further include a cured filler material in the space to inhibit fluid ingress between the opposing cylindrical or tapered complementary surfaces of the male and female portions and the solid mechanical coupling elements.

The solid mechanical coupling elements may include an electrically insulating material and the cured filler material may include a thermoplastic electrically insulating material such that the male and female portions are electrically insulated from each other.

The cooperating grooves may define at least one passageway encircling the common axis, and such at least one passageway may have a varying pitch.

The cooperating grooves may define a plurality of separate passageways encircling the common axis and at least two of the separate passageways may have a different pitch.

The cooperating grooves may define a plurality of separate passageways encircling the common axis and at least two of the separate passageways may have opposing pitch.

The cooperating grooves may define a plurality of separate passageways, and at least one of the separate passageways may be disposed at a right angle to the common axis.

The cooperating grooves may define a plurality of separate passageways, and at least one of the separate passageways may be aligned with the common axis.

The cooperating grooves may define a plurality of separate passageways, and each passageway may have at least one portion disposed at a right angle to the common axis.

The cooperating grooves may define a plurality of separate passageways, and each passageway may have at least one portion aligned with the common axis.

The cooperating grooves may define a plurality of irregularly positioned separate passageways, and each irregularly positioned separate passageway may have portions disposed at different angles to the common axis.

The female portion may be a female gap sub member of a downhole bore assembly and the male portion may be a male gap sub member of a downhole bore assembly. The apparatus may further include an electromagnetic energy transmitter or receiver, positioned within the male and female gap sub members.

The transmitter or receiver may have first and second antenna contacts and the first contact may be in electrical contact with the female portion of the gap sub member and the second contact may be in electrical contact with the male portion of the gap sub member such that the transmitter or receiver can transmit or receive electromagnetic energy through the earth, between the female and male gap sub members and a remotely located receiver or transmitter.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 9 is an oblique view of a male gap sub member having a tapered complementary surface with grooves disposed to form a plurality of passageways, each passageway having portions at different angles to a common axis, according to an alternate embodiment of the invention;

FIG. 10 is a oblique view of a male gap sub member like the one shown in FIG. 9 but having a cylindrical surface in which the grooves are formed, according to an alternate embodiment of the invention;

FIG. 12 is an oblique view of a male gap sub member having a tapered complementary surface with grooves disposed to form a plurality of passageways, each passageway having portions disposed at different angles to a common axis, according to an alternate embodiment of the invention;

FIG. 13 is a oblique view of a male gap sub member like that shown in FIG. 12 but having a cylindrical surface in which the grooves are formed, according to an alternate embodiment of the invention;

DETAILED DESCRIPTION

Figure 1:
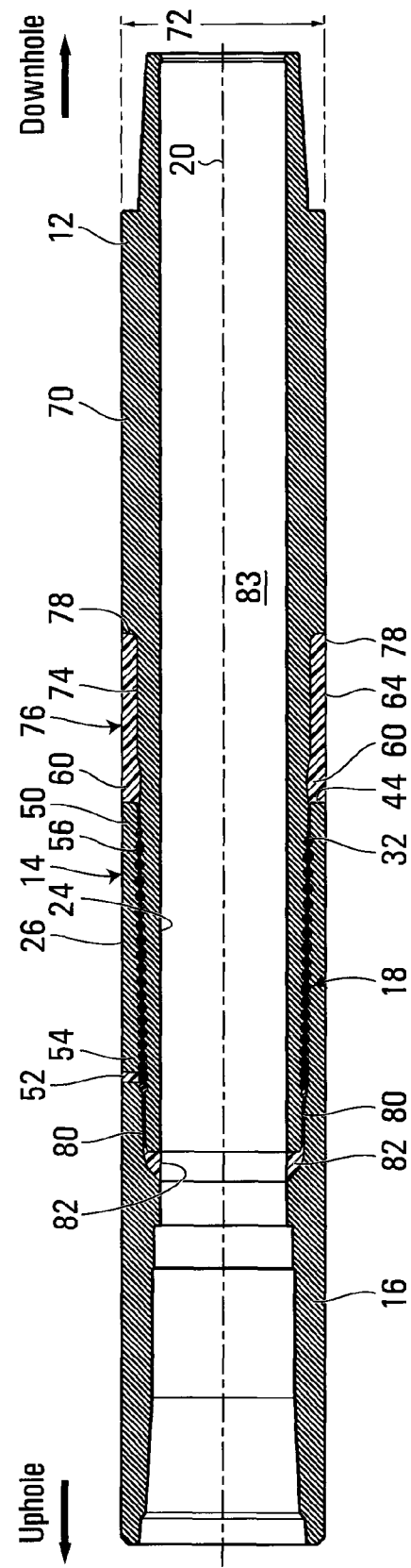
FIG. 1 is a cross-sectional view of a gap sub member of a downhole bore assembly employing a coaxial coupling according to a first embodiment of the invention.

Referring to FIG. 1 a coaxial coupling apparatus according to a first embodiment of the invention is shown generally at 10. The apparatus includes a first body 12 having a male coupling portion shown generally at 14 and further includes a second body 16 having a female coupling portion 18 complementary in shape to the male coupling portion 14. The first and second bodies 12 and 16 are generally hollow cylindrical in shape and the male and female coupling portions 14 and 18 are axially aligned on a common axis 20. In the embodiment shown, the first and second bodies 12 and 16 are respective portions of a gap sub member for use as part of a downhole bore assembly such as shown at 22 in FIG. 2. In the embodiment shown, the first body 12 may be connected to downhole portions of the downhole bore assembly 22 and the second body 16 may be connected to uphole portions of the downhole bore assembly. Both the first body 12 and the second body 16 may be formed from stainless steel, for example. The apparatus 10 provides for coaxial coupling between the first body 12 and the second body 16, while electrically isolating the first body 12 from the second body 16, and facilitates use of the apparatus as an antenna for transmitting signals to a receiver locater at the earth's surface or to a receiver located in the earth, from deep inside a bore hole, for example. The apparatus may also be used as an antenna for receiving signals from the earth's surface or from deep inside a bore hole.

Figure 3:
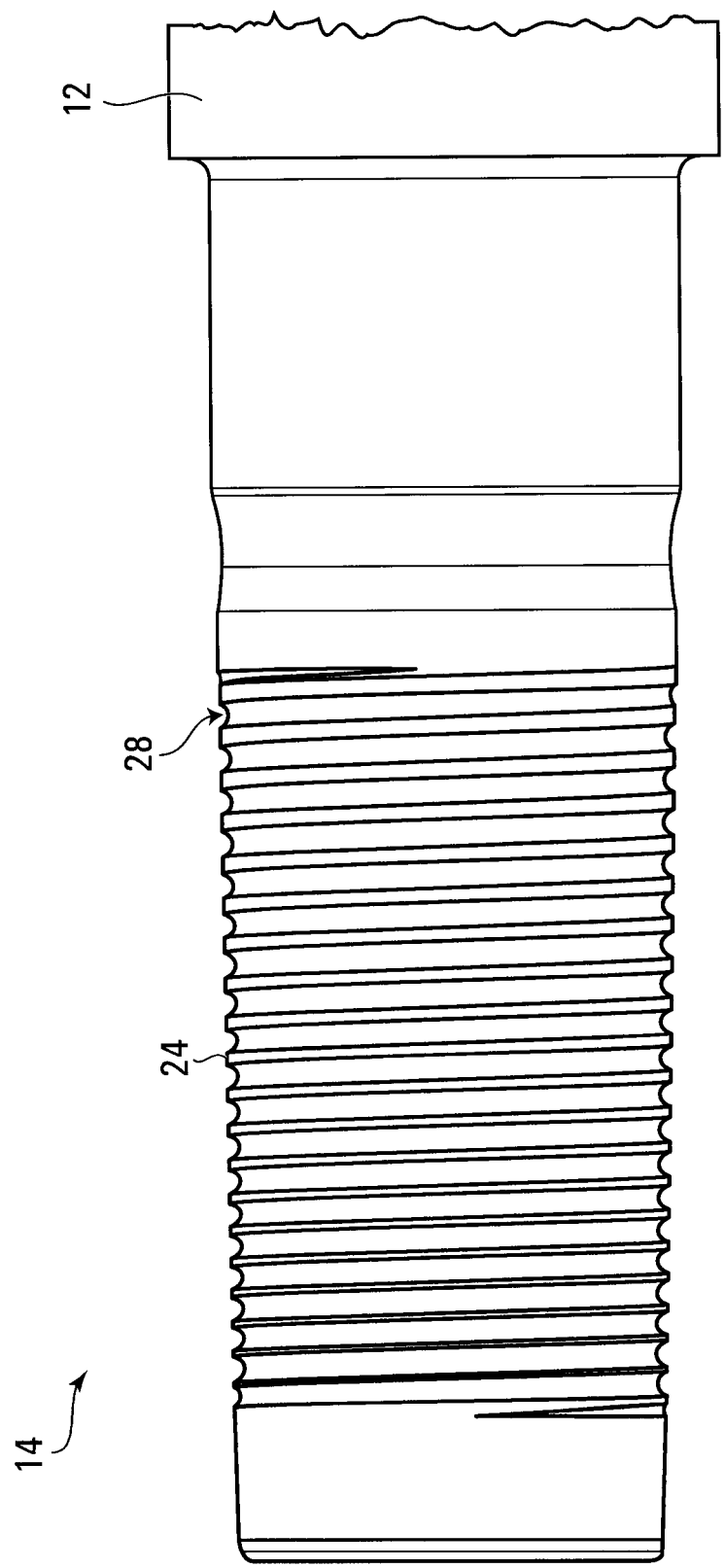
FIG. 3 is a fragmented side view of a male portion of a first body of the gap sub member shown in FIG. 1.
Figure 4:
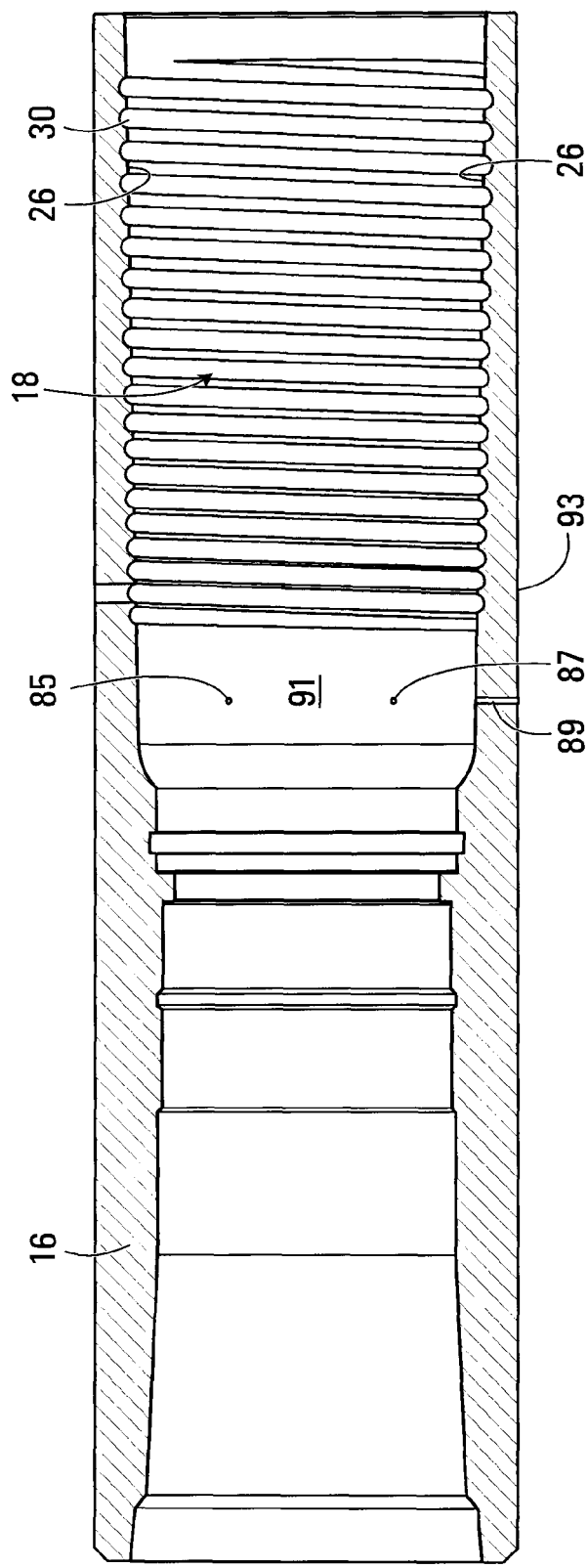
FIG. 4 is a cross-sectional view of a female portion of a second body of the gap sub member shown in FIG. 1, which is complementary to the male member shown in FIG. 3.
Figure 5:
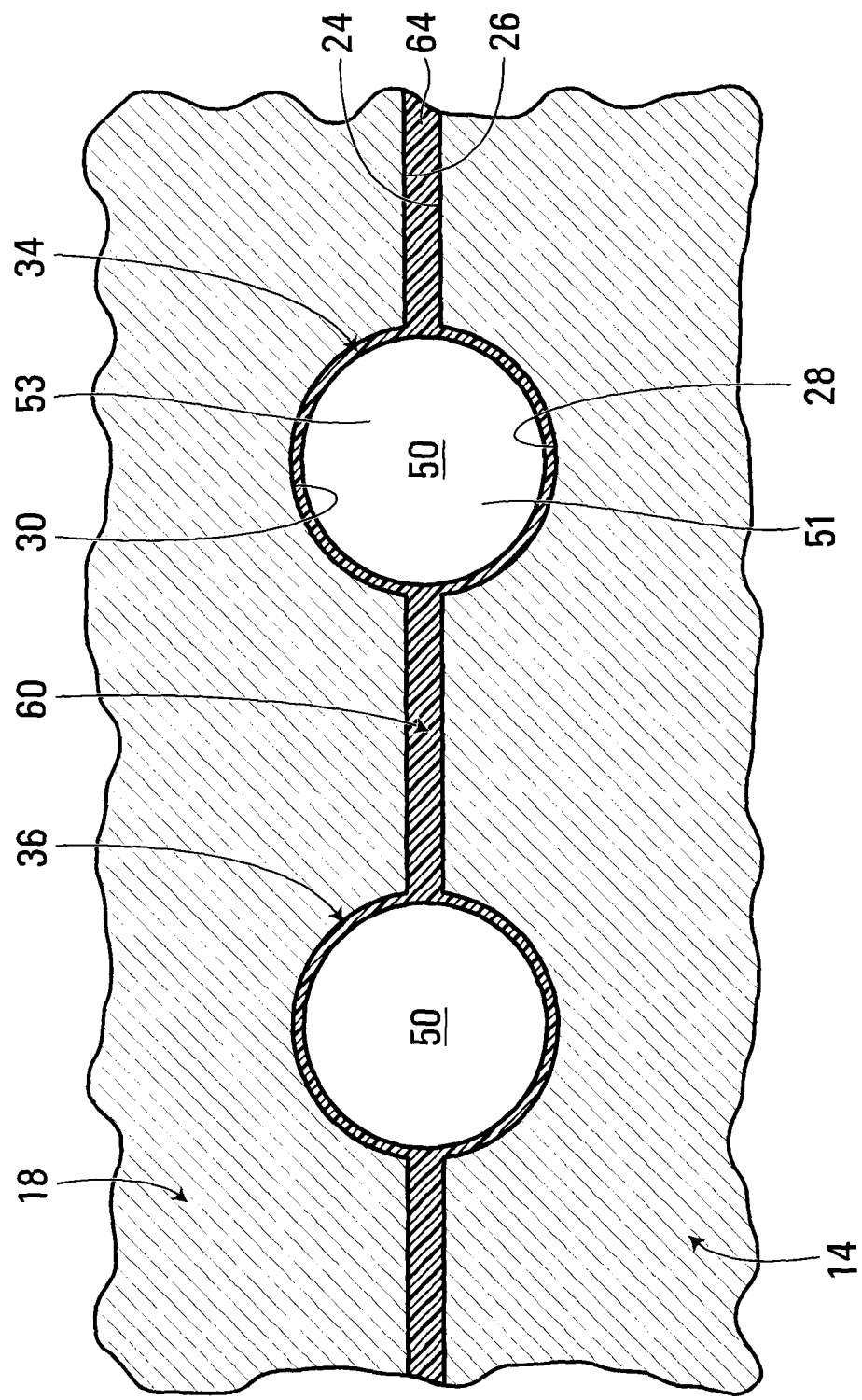
FIG. 5 is a fragmented cross-sectional view of passageway portions of a passageway formed by grooves in the male and female portions shown in FIGS. 3 and 4.

Referring back to FIG. 1, and to FIGS. 3 and 4 the male and female coupling portions 14 and 18 have opposing tapered complementary surfaces 24 and 26 respectively, having respective cooperating grooves 28 and 30, that are aligned as shown in FIG. 5 by suitable axial positioning of the male coupling portion 14 in the female coupling portion 18. In the embodiment shown, the male and female coupling portions 14 and 18 have a circular cross sectional shape. However in other embodiments, the male and female coupling portions 14 and 18 may have any cross-sectional shape, such as triangular, square, hexagonal, multisided, and fluted cross-sectional shapes, for example.

Referring to FIGS. 1 and 5, in the embodiment shown, the cooperating grooves 28 and 30 form a passageway 32 having a plurality of passageway portions, two of which are shown at 34 and 36, between the opposing tapered complementary surfaces 24 and 26. At least two of the passageway portions, in this embodiment the passageway portions 34 and 36, are disposed at different angles 38 and 40 to the common axis 20 as seen best in FIG. 1.

In the embodiment shown, the passageway 32 is formed in a spiral around the common axis 20 and has a varying pitch which varies from a relatively small pitch near a distal end portion 42 of the male coupling portion 14 to a much larger pitch near a distal end portion 44 of the female coupling portion 18. In this embodiment, where the apparatus is used on a gap sub member, the angle of pitch of the passageway increases in the downhole direction.

Figure 6:
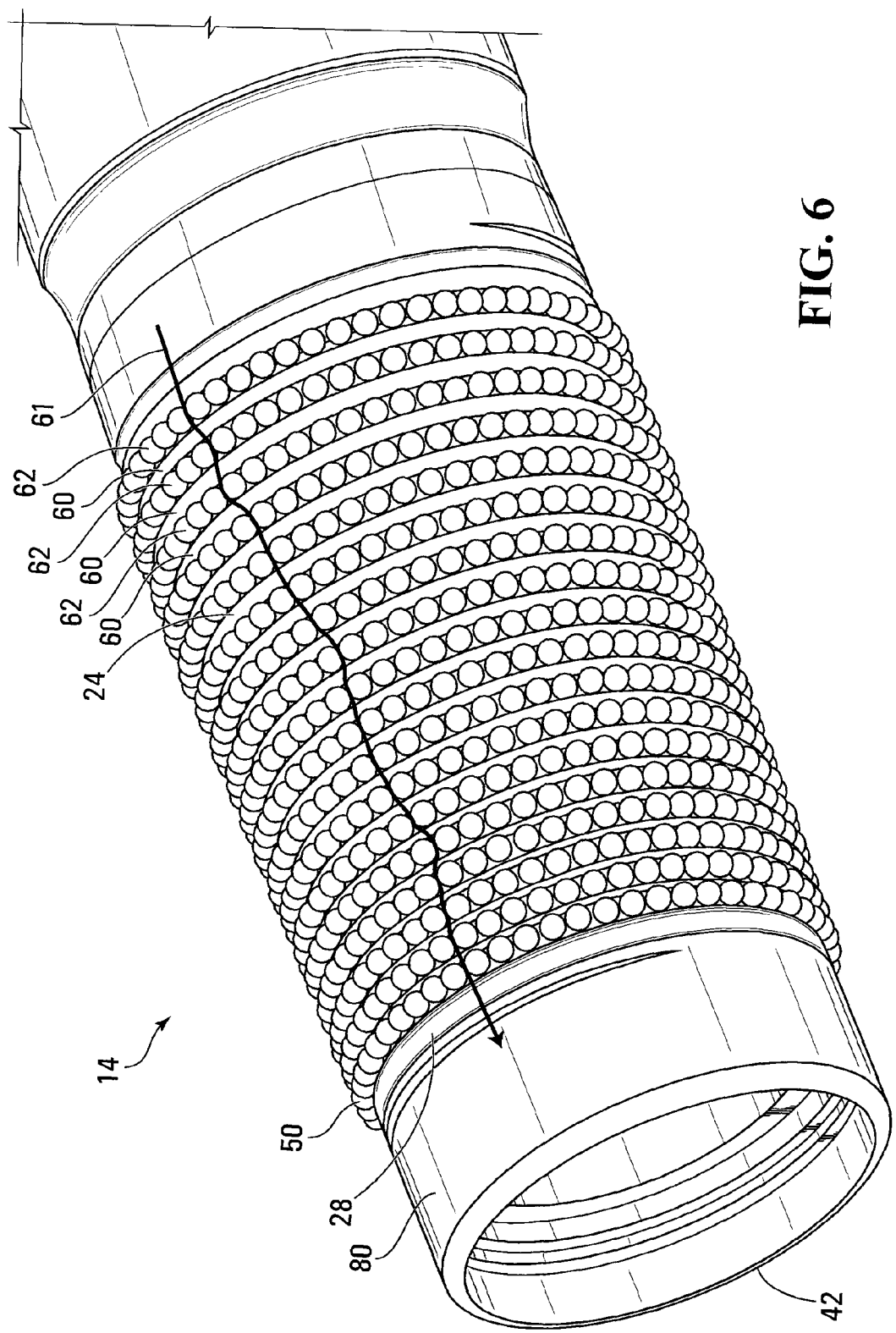
FIG. 6 is an oblique top view of the male member shown in FIG. 3 with a contiguous line of solid mechanical coupling elements disposed in a groove thereof.

Referring to FIGS. 1 and 5, a plurality of solid mechanical coupling elements 50 are disposed in the passageway 32 such that the passageway 32 is substantially full of the solid mechanical coupling elements as shown in FIG. 6. The solid mechanical coupling elements 50 may have a spherical or ellipsoid shape, for example, and may be comprised of an insulating material. Other solid 3-dimensional shapes such as polyhedral shapes (e.g., Cube, Octahedron, Dodecahedron, Icosahedron, etc.) may alternatively be employed. The insulating material may be a ceramic material, for example. Where the apparatus 10 is used for a gap sub coupling, the solid mechanical coupling elements 50 may be Ceramic Balls of a type that is common in the bearing manufacturing industry, for example.

In the embodiment shown, the passageway 32 may be configured to have a diameter of about 0.219 inches (0.556 cm) to about 0.220 inches (0.559 cm) and the solid mechanical coupling elements 50 may be formed to have a diameter of about 0.2188 inches (0.557 cm), for example, to provide for a 0.0002 inch (0.005 cm) to a 0.0012 inch (0.0030 cm) clearance between the solid mechanical coupling elements and the walls of the cooperating grooves 28 and 30.

Referring to FIG. 1, to facilitate installing the solid mechanical coupling elements 50, in the embodiment shown, a conduit 52 is formed in the female coupling portion 18 to extend between an outer surface 54 of the female coupling portion 18 and a portion of the groove 30 formed in the tapered complementary surface 26 of the female coupling portion 18. The solid mechanical coupling elements 50 may be inserted into the conduit 52 thereby enabling the solid mechanical coupling elements to enter the passageway 32. Pressurized air, or other means for example, may be used to force the solid mechanical coupling elements 50 along the passageway 32 until they reach a final passageway portion 56 such that the plurality of solid mechanical coupling elements 50 lies in a contiguous spiral as shown in FIG. 6, wherein each solid mechanical coupling element is in contact with an adjacent solid mechanical coupling element. Once the solid mechanical coupling elements 50 have been loaded into the passageway 32 the conduit 52 is sealed off by a screw plug or thermoplastic injected plug, for example, to prevent loss of the solid mechanical coupling elements from the passageway and to prevent fluid ingress.

Referring to FIG. 5, the cooperating grooves 28 and 30 are formed in the opposing tapered complementary surfaces 24 and 26 such that when the male and female coupling portions 14 and 18 are properly aligned, approximately a first half 51 of each of the solid mechanical coupling elements 50 is disposed in the groove 28 while a second half 53 of each of the solid mechanical coupling elements 50 is disposed in the groove 30. With the solid mechanical coupling elements 50 disposed in this manner, relative axial movement of the first and second bodies 12 and 16 causes shear loads on the solid mechanical coupling elements and the solid mechanical coupling elements prevent the first and second bodies from being separated longitudinally. The varying pitch of the spiral pathway defined by the passageway 32, in this embodiment, also places the solid mechanical coupling elements 50 in a shear mode and prevents relative rotation between the first and second bodies 12 and 16, respectively. Thus, the solid mechanical coupling elements 50 couple the first and second bodies 12 and 16 together and prevent relative axial and relative rotational movement between the first and second bodies respectively.

Still referring to FIG. 5, the opposing tapered complementary surfaces 24 and 26 of the male and female coupling portions 14 and 18 respectively are spaced apart and define a space 60 between these opposing tapered complementary surfaces, on opposite sides of each of the passageway portions. Initially, as described above, in the embodiment shown, there is a 0.0002 inch (0.005 cm) to 0.0012 inch (0.0030 cm) clearance between the solid mechanical coupling elements 50 and the walls of the cooperating grooves 28 and 30 such that there is little or no space between the solid mechanical coupling elements and the adjacent walls of the cooperating grooves 28 and 30 and the solid mechanical coupling elements are virtually in contact with the adjacent walls of both grooves 28 and 30. A thermoplastic material 64 such as a glass-filled engineered resin in the liquid state may be injected into the space 60 and allowed to cure to provide an insulating filler between the opposing tapered complementary surfaces 24 and 26 and between immediately adjacent solid mechanical coupling elements 50 in the passageway 32. With the thermoplastic material 64 being an insulator and where the solid mechanical coupling elements 50 are formed of a ceramic non-insulating material, complete electrical isolation is provided between the male and female coupling portions 14 and 18 and hence, between the first and second bodies 12 and 16. The thermoplastic material 64 confines the solid mechanical coupling elements 50 in the passageway 32 and provides a seal that prevents fluid ingress and egress relative to an interior space 83 defined inside the first and second bodies 12 and 16.

Figure 2:
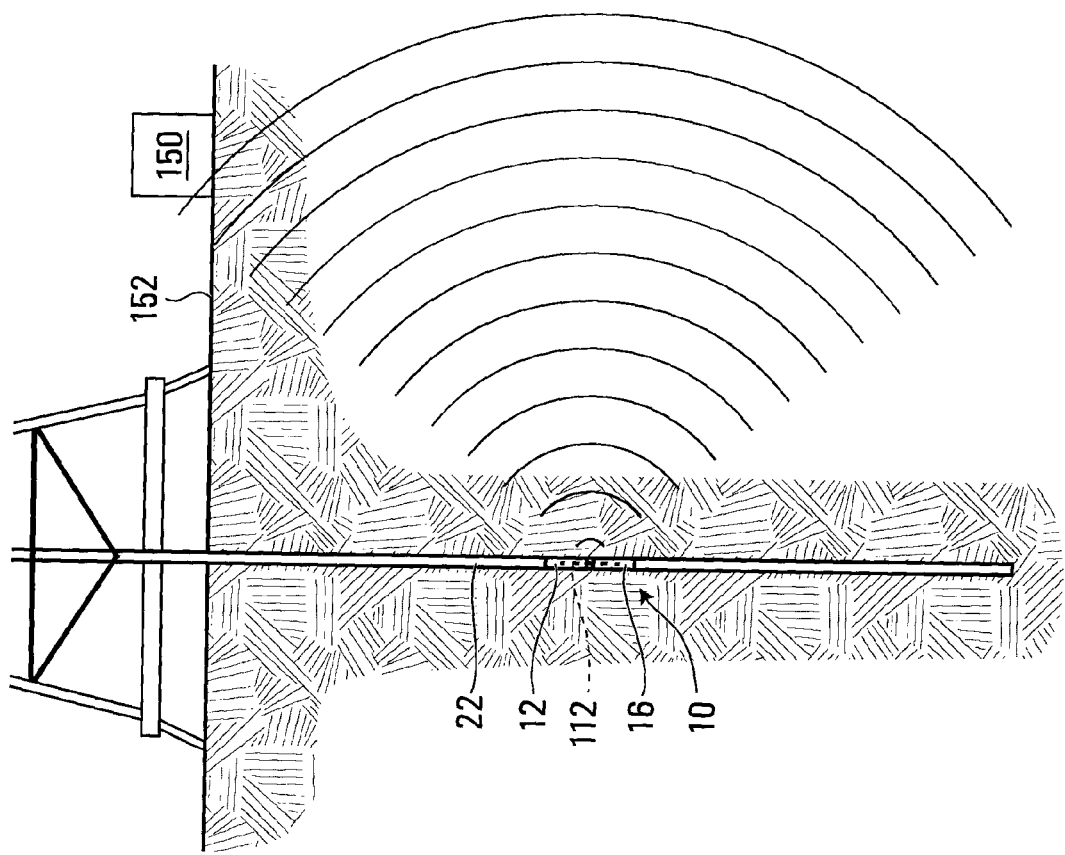
FIG. 2 is a schematic diagram of a downhole bore assembly employing the gap sub member shown in FIG. 1.

Referring back to FIG. 1, the first body 12 has an outer cylindrical surface 70 of a first diameter 72 that may be the same diameter as a diameter of a drill string component of the downhole bore assembly 22 shown in FIG. 2. The first body 12 also has an area of reduced diameter 74 which extends to define an annular recess 76 that extends between the distal end portion 44 of the female coupling portion 18 and a shoulder 78 in the male coupling portion 14, defining the area of reduced diameter 74 when the first and second bodies 12 and 16 are aligned in a manner in which the passageway 32 is defined. Referring to FIGS. 1, 5, and 6 the thermoplastic material 64 may be injected into the recess 76 and is forced under pressure into the space 60 between the opposing tapered complementary surfaces 24 and 26 and moves in an axial direction as shown at 61 to completely occupy the space 60 between respective portions of the passageway 32 and to occupy spaces 62 between adjacent solid mechanical coupling elements 50 in the passageway 32, as shown in FIG. 6. The thermoplastic material emerges from a final space 80 adjacent the distal end portion 42 of the male coupling portion 14 into an annular recess 82 formed in the female coupling portion 18, adjacent the final space 80. A mandrel for example, not shown, may be pre-inserted into the interior space 83 to prevent the thermoplastic material 64 from entering the interior space 83. The mandrel may be removed later, if desired to permit a transmitter, receiver, measurement probe or other device, for example, to be received in the interior space 83. In addition a plurality of radially extending bores such as shown at 85, 87 and 89 in FIG. 4 are provided in the female coupling portion 18 to provide for air release when the thermoplastic material 64 is injected into the space 60. The bores 85, 87 and 89 extend from an inner annular surface 91 to an outer cylindrical surface 93 of the female coupling portion as shown best by bore 89. Some of the liquid thermoplastic material 64 may emerge from these bores 85, 87, 89 during injection thereof, leaving small whiskers protruding from the bores 85, 87, 89. These whiskers are then trimmed off.

Figure 7:
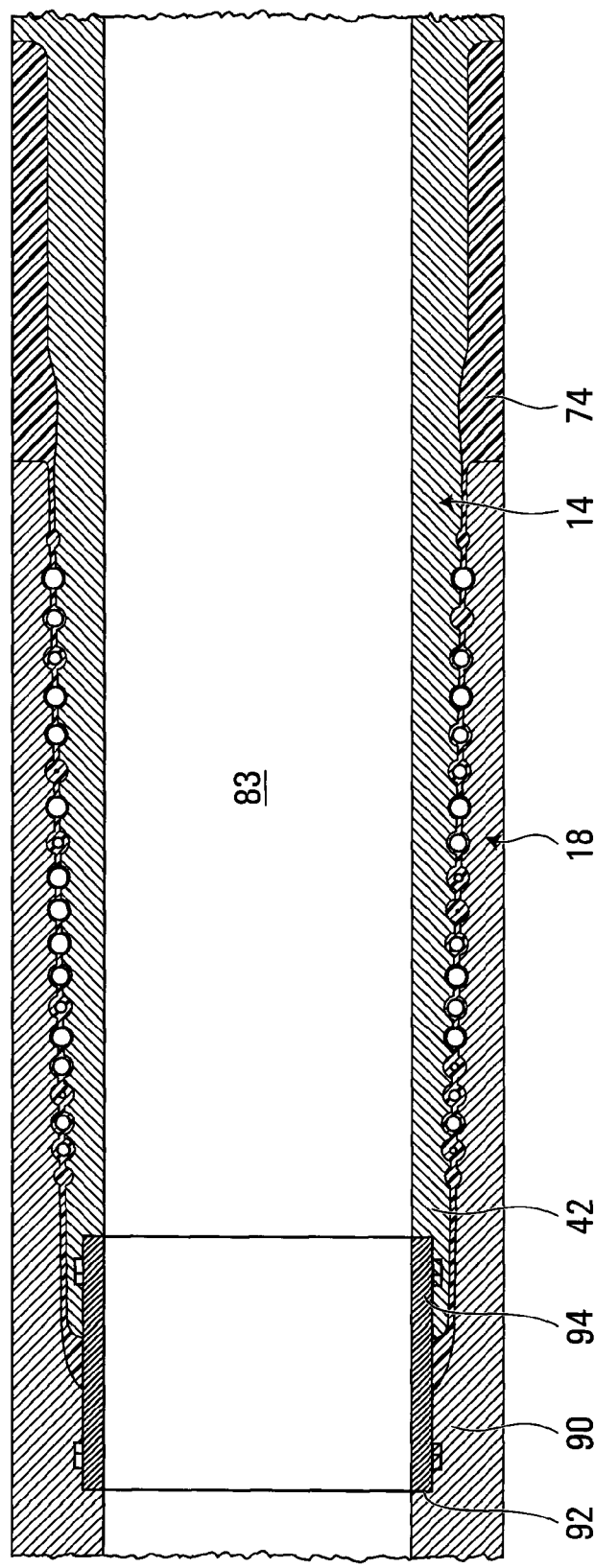
FIG. 7 is a fragmented cross-sectional view of a gap sub member employing a coaxial coupling apparatus according to an alternate embodiment of the invention.

In one embodiment, referring to FIG. 7, the distal end portion 42 of the male coupling portion 14 and an adjacent portion 90 of the female coupling portion 18 may be formed to define an annular recess 92 for receiving an annular ceramic seal 94, for example, to prevent the thermoplastic material 64 from entering the interior space 83 of the apparatus.

Figure 8:
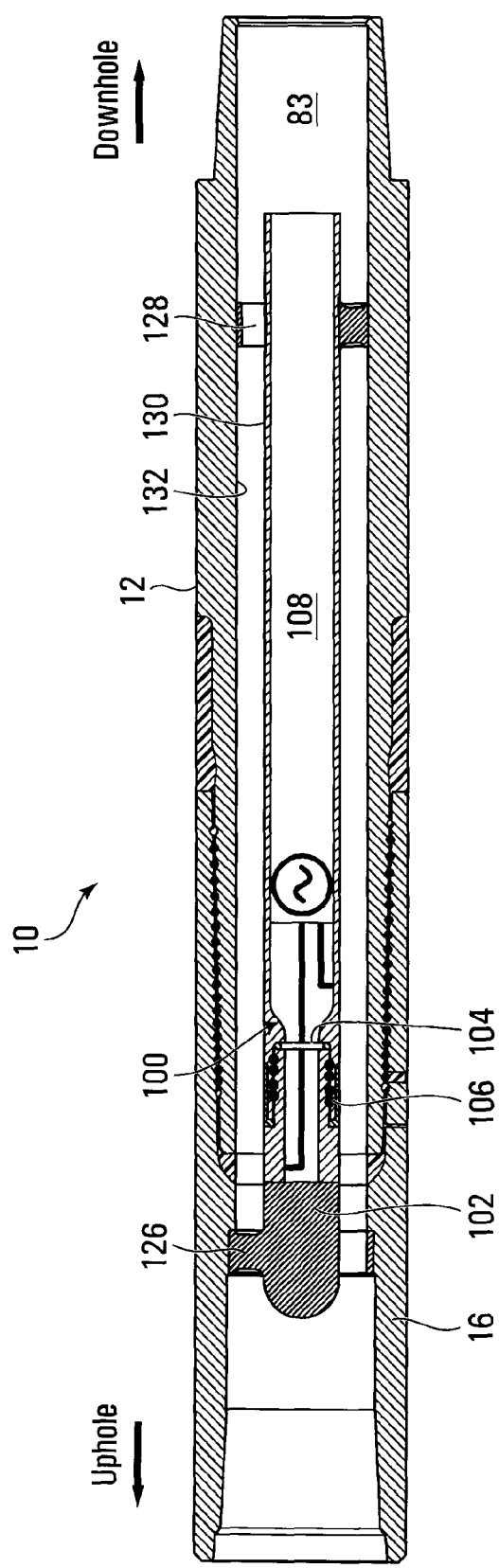
FIG. 8 is a cross-sectional view of the gap sub member shown in FIG. 1 with a transmitter installed in an interior portion thereof.

Referring to FIG. 8, an electromagnetic energy transmitter unit is shown generally at 100 disposed inside the interior space 83 of the apparatus 10. Alternatively, an electromagnetic energy receiver or transceiver or other component may be disposed in a similar manner in the interior space 83. In this embodiment the electromagnetic energy transmitter unit 100 is provided in the form of a probe having a male portion 102 and a female portion 104 coupled by solid mechanical coupling elements 106 in the same manner as described above in which the first and second bodies 12 and 16 are joined together. The female portion 104 has an interior space 108 in which is installed a transmitter 112 (or receiver or transceiver) for providing electromagnetic energy transmitter (and/or receiver) functions. The connection formed by the solid mechanical coupling elements 106 is an insulated connection like the connection between the first and second bodies 12 and 16. The male portion 102 includes a first annular connector 126 for electrically connecting the male portion of the electromagnetic energy transmitter unit 100 to the second body 16. Similarly, a second annular connector 128 is interposed between an outer wall 130 of the female portion 104 and an inner wall 132 of the first body 12 to thereby provide an electrical connection between the female portion 104 and the first body 12.

Referring to FIG. 2, the transmitter 112 can thus produce the necessary signals to cause the gap sub to act as an antenna and transmit information from the apparatus 10 to the surface thereby enabling communications from the apparatus 10 to a remotely located receiver 150 located at the surface 152. Similarly, the apparatus 10 can be used to transmit information to a remotely located receiver or receivers further up or down the downhole bore assembly 22.

As discussed above, alternatively, the transmitter 112 may be part of a transceiver allowing for transmission and reception of electromagnetic energy, or it may be replaced by a receiver, where it is desired to only receive electromagnetic signals from a remotely located transmitter. Such a remotely located transmitter may be located further up or down the downhole bore assembly 22. In addition, a plurality of apparatuses of the type shown at 10 may be employed on the downhole bore assembly with transmitters and/or receivers or transceivers to provide a communications relay system, for example.

Various modifications can be made to the above-described coupling apparatus 10, some of which are shown in FIGS. 9-17. In each of the following embodiments, male and female coupling portions of respective first and second bodies to be connected together have respective cooperating grooves in opposing cylindrical or tapered complementary surfaces to form a plurality of separate and distinct passageways rather than only a single passageway having a plurality of passageway portions as described above.

FIG. 9, for example shows an embodiment in which first, second, third and fourth separate and distinct passageways are formed by respective grooves 160, 162, 164, and 166 formed in tapered complementary surfaces of male and female coupling portions, only the male coupling portion 168 being shown in FIG. 9. Each of the grooves 160, 162, 164, and 166 and hence each passageway will have portions 170 disposed at right angles to a common axis 172 and portions 174 disposed in alignment with the common axis. Thus each resulting passageway will have a plurality of passageway portions at least two of which are disposed at different angles (e.g. 90 degrees and 0 degrees) to the common axis 172.

Again, solid mechanical coupling elements such as shown at 50 in FIG. 1 are loaded into each passageway through respective conduits, configured as described above, such that each passageway is substantially full of solid mechanical coupling elements in a manner the same as that shown in FIG. 6. The above-described thermoplastic material 64 may be injected into spaces between adjacent portions of each passageway and between each of the separate and distinct passageways to prevent moisture ingress and egress.

Figure 11:
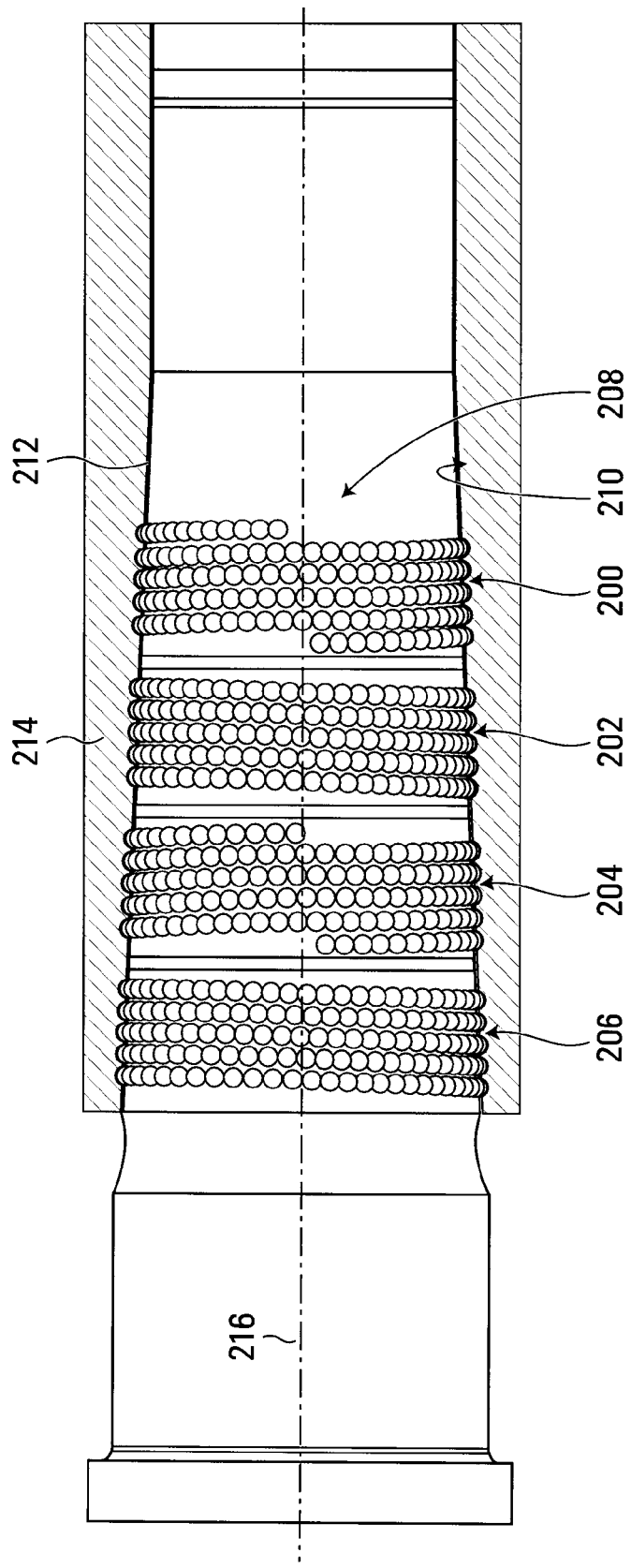
FIG. 11 depicts various cross-sectional views of a gap sub member employing male and female portions of first and second bodies respectively having a plurality of passageways, at least two of which are disposed at different angles to a common axis.

Referring to FIG. 10, the same first, second, third and fourth separate and distinct passageways shown in FIG. 10 are formed by respective grooves 180, 182, 184 and 186 in male and female cylindrical surfaces of male and female coupling portions, only the male coupling portion 188 being shown in FIG. 11, rather than tapered surfaces like that shown in FIG. 9.

FIGS. 11-17 show embodiments in which each separate and distinct passageway of the plurality of passageways is formed between opposing cylindrical or tapered complementary surfaces and at least two of the passageways are disposed at different angles to the common axis.

Referring to FIG. 11, for example, first, second, third and fourth relative separate and distinct passageways 200, 202, 204, and 206 are formed by respective grooves formed in tapered complementary surfaces 208 and 210 of male and female coupling portions 212 and 214. The first and third passageways 200 and 204 have a right handed pitch relative to a common axis 216, and the second and fourth passageways 202 and 206 have a left-handed pitch. Thus, the first and third passageways 200 and 204, are disposed at a constant negative pitch angle relative to the common axis 216 while the second and fourth passageways 202 and 206 are disposed at a constant positive pitch angle thereto. In this embodiment, the pitch angles need not be constant and could vary along the axis, if desired.

Referring to FIG. 12, first, second, third and fourth separate and distinct passageways are formed by respective first, second, third, and fourth grooves 220, 222, 224, and 226 formed in tapered complementary surfaces of male and female coupling portions, only the male coupling portion 228 being shown in FIG. 12. The first and third grooves 220 and 224 have a first common relatively small right handed angle pitch relative to a common axis 230, and the second and fourth grooves 222 and 226 have a second common relatively large right-handed pitch angle, greater than the first pitch angle. Again, the pitch angles need not be constant and could vary along the axis, if desired.

Referring to FIG. 13, the same first, second, third and fourth separate and distinct passageways shown in FIG. 12 are formed by respective first, second, third and fourth grooves 240, 242, 244 and 246 in a cylindrical surface 248 rather than a tapered surface like that shown in FIG. 12.

Figure 14:
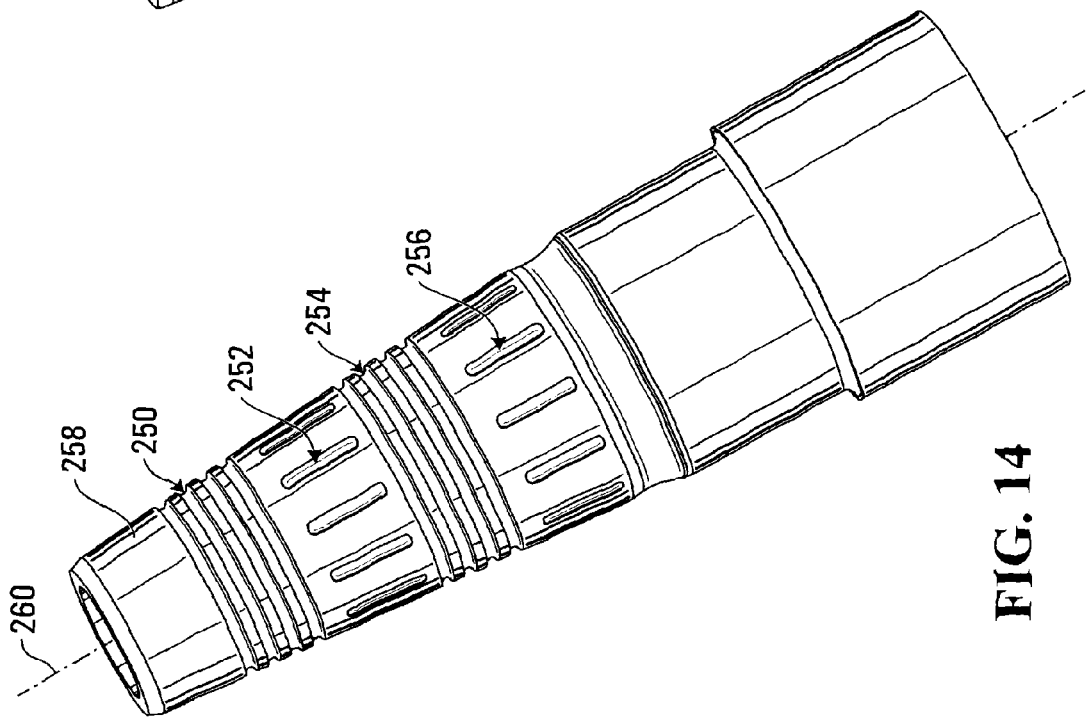
FIG. 14 is an oblique view of a male gap sub member having a tapered complementary surface with grooves disposed to form a plurality of groups of passageways, at least two groups having passageways at different angles to a common axis, according to an alternate embodiment of the invention.

Referring to FIG. 14, first, second, third and fourth separate and distinct groups 250, 252, 254 and 256 of passageways are formed by respective grooves formed in tapered complementary surfaces of male and female coupling portions, only the male coupling portion 258 being shown in FIG. 14. The first and third groups 250 and 254 include a plurality of annular grooves disposed at right angles to a common axis 260 while the second and fourth groups 252 and 256 include a plurality of short passageways that are disposed in longitudinal alignment with the common axis 260.

In the embodiment shown, the first and third groups 250 and 254 each have four grooves and the second and fourth groups 252 and 256 each have 24 grooves. Each of the grooves of the second and fourth groups holds about 11 balls that act as the solid mechanical coupling elements, the balls being as described in connection with FIG. 5. The embodiment shown in FIG. 14 provides a very strong coupling capable of withstanding a torque on the order of 10,000 ft-lbs, for example. In the embodiment shown, each corresponding groove in the complementary female portion has its own conduit like that shown at 52 in FIG. 1, for receiving solid mechanical coupling elements in respective grooves. Alternatively the grooves of each of the groups may have communication conduits (not shown) therebetween and similar communication conduits may be provided between groups to enable all of the grooves to be filled with solid mechanical coupling elements from a single conduit opening.

Figure 15:
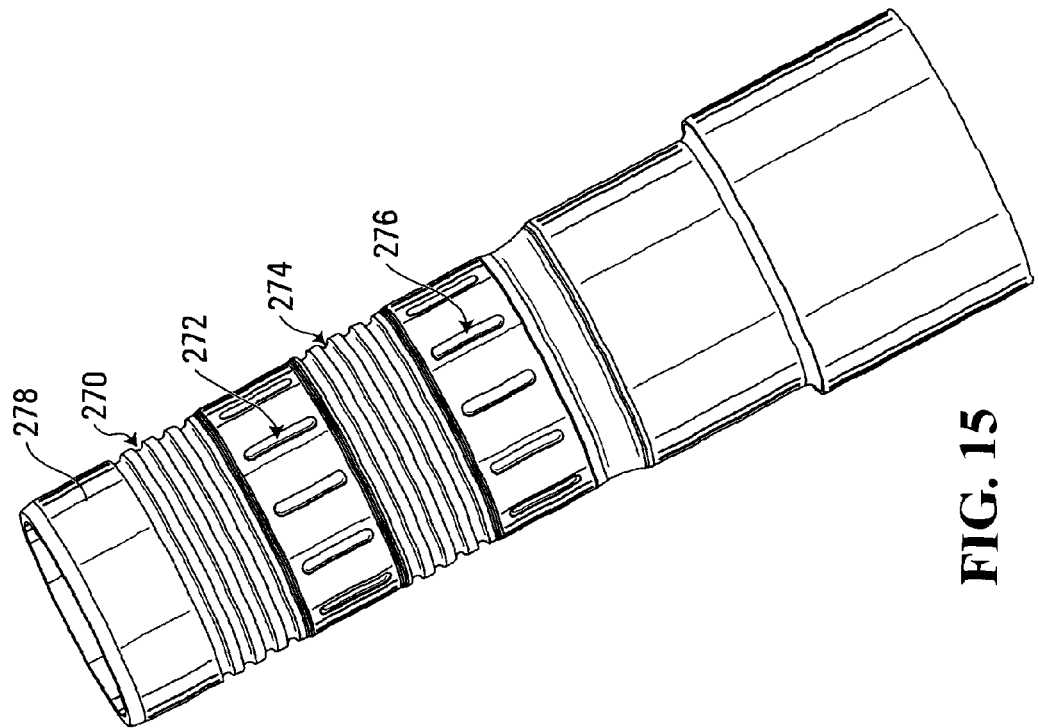
FIG. 15 is an oblique view of a male gap sub member like that shown in FIG. 14 but having a cylindrical surface in which the grooves are formed, according to an alternate embodiment of the invention.

Referring to FIG. 15, the same first, second, third and fourth separate and distinct groups of passageways shown in FIG. 14 are formed by respective first, second, third and fourth grooves 270, 272, 274, 276 in a cylindrical surface 278 rather than a tapered surface like that shown in FIG. 14.

Figure 16:
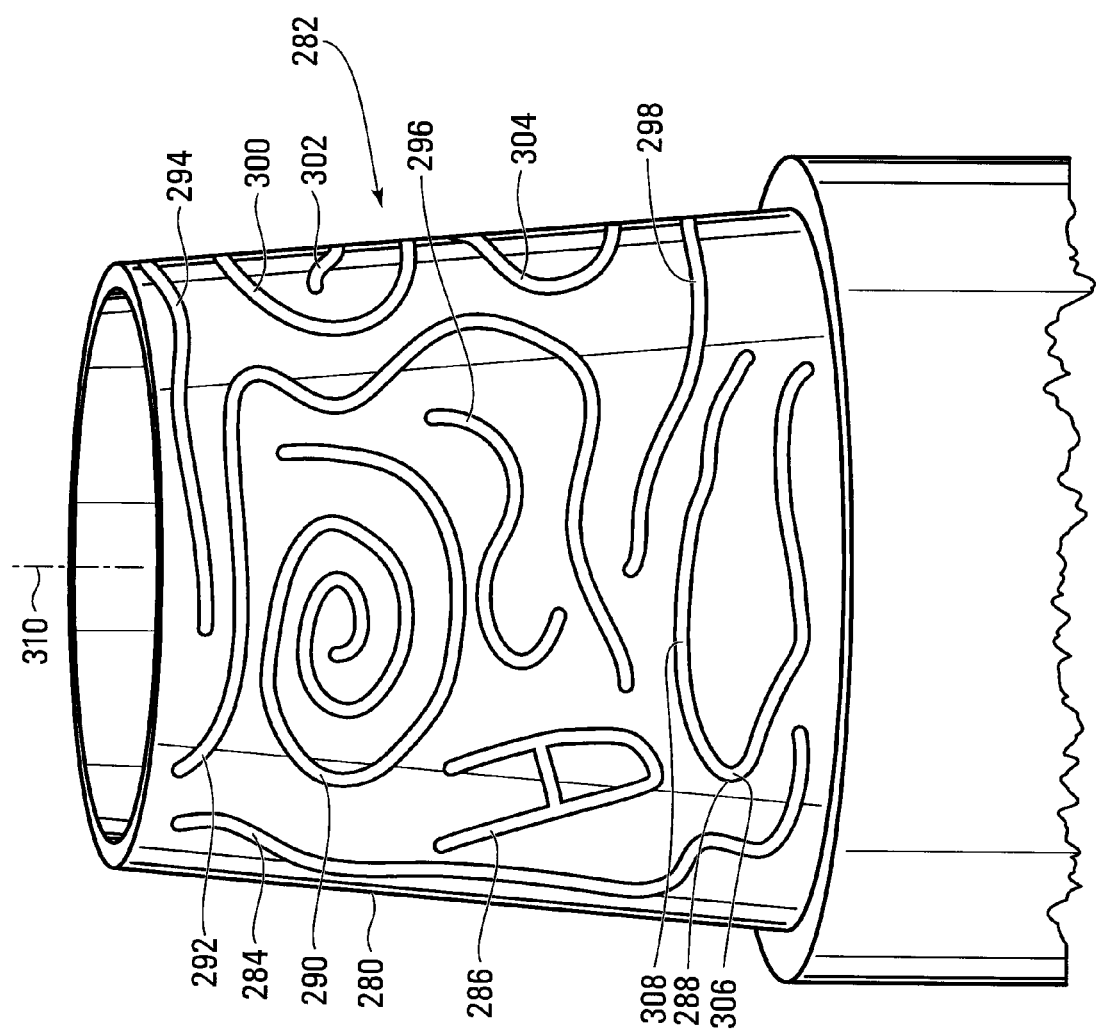
FIG. 16 is an oblique view of a tapered surface of a male coupling portion having a plurality of irregularly positioned separate passageways, each having portions that are disposed at different angles to a common axis, according to a further alternate embodiment of the invention.

Referring to FIG. 16, a tapered surface 280 of a male connecting portion 282 is shown with a plurality of irregularly or randomly positioned separate grooves 284-304, each having portions only two of which are shown at 306 and 308 in the groove 288 that are disposed at different angles to a common axis 310.

Figure 17:
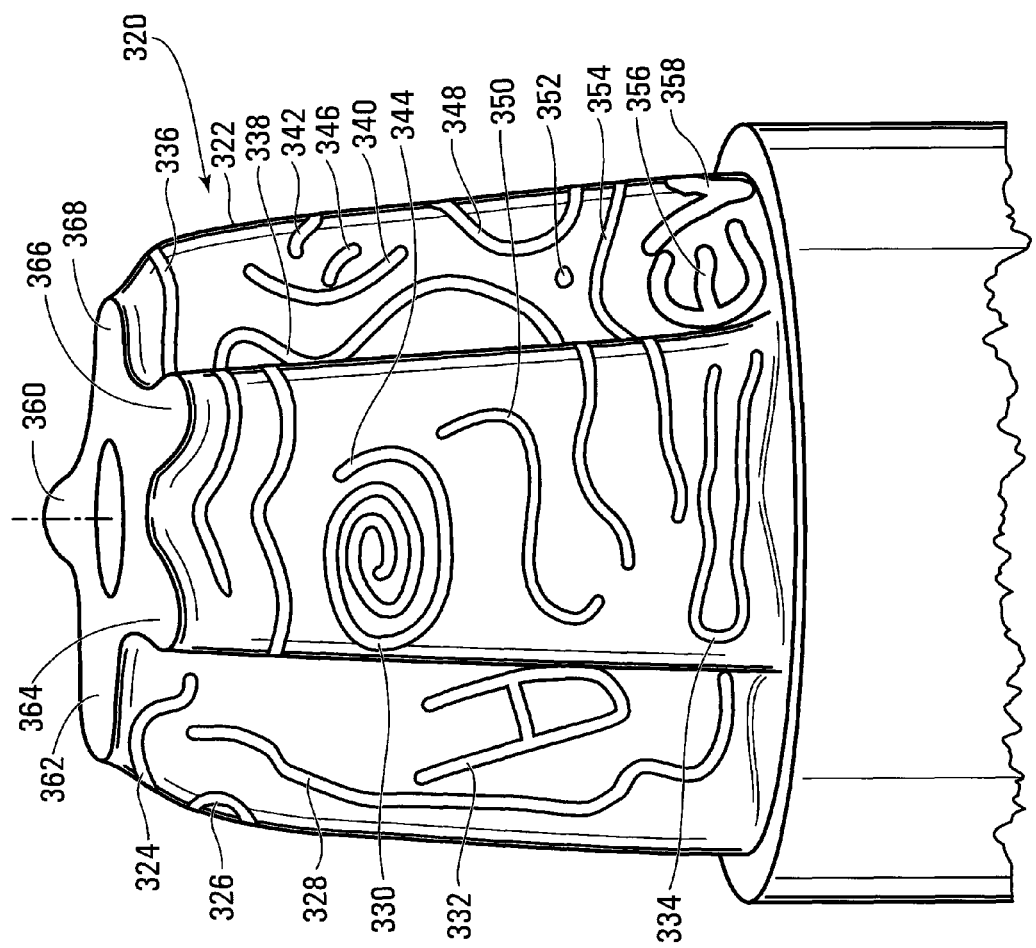
FIG. 17 is an oblique view of a non-linear tapered asymmetrically disposed multi-lobed surface of a male coupling portion having a plurality of irregularly positioned separate passageways, each having portions that are disposed at different angles to a common axis, according to a further alternate embodiment of the invention.

Referring to FIG. 17, in this embodiment, a male connecting portion 320 is shown as having a non-linearly tapered surface 322 having a plurality of irregularly or randomly positioned separate grooves 324-358 and a multi-lobed cross-sectional shape that may include symmetrically arranged lobes or asymmetrically arranged lobes, such asymmetrically arranged lobes are shown at 362-368 in FIG. 17.

In the embodiments described and with reference to FIG. 1, the solid mechanical coupling elements 50 bear substantially all of the shear loads between the first and second bodies 12 and 16 and thus the integrity of the coupling is primarily provided by the solid mechanical coupling elements with very little, or effectively no, reliance on the thermoplastic material 64 to mechanically join the first and second bodies 12 and 16 together. Rather, the thermoplastic material 64 prevents moisture ingress and egress from the interior space 83. Substantially all of the mechanical connection between the first and second bodies 12 and 16 is provided by the solid mechanical coupling elements 50. Furthermore, the use of a contiguous spiral of solid mechanical coupling elements 50 in passageways or passageway portions that are disposed at different angles to the common axis distributes shear loading among all of the solid mechanical coupling elements allowing each of them to contribute to mechanically resisting relative rotational and longitudinal movement between the first and second bodies 12 and 16.

While specific embodiments of the invention have been described and illustrated, such embodiments should be considered illustrative of the invention only and not as limiting the invention as construed in accordance with the accompanying claims.

The invention claimed is:

1. A method of joining first and second bodies coaxially together to resist relative axial and rotational movement between the bodies, the method comprising:
    receiving a male portion of the first body in a complementary female portion of the second body;
    aligning said male and female portions axially on a common axis such that respective cooperating grooves in opposing cylindrical or tapered complementary surfaces of said male and female portions are aligned to form a plurality of passageways or a passageway having a plurality of passageway portions, between said opposing cylindrical or tapered complementary surfaces, at least two of said passageways or at least two of said passageway portions being disposed at different angles to said common axis, each angle being defined between a direction of the common axis and a direction in which one of the at least two of said passageways or one of the at least two of said passageway portions extends; and
    loading solid mechanical coupling elements into each passageway or into said passageway having said plurality of passageway portions, such that said each passageway or said passageway having said plurality of passageway portions is substantially full of said solid mechanical coupling elements.

2. The method of claim 1 wherein loading said solid mechanical coupling elements comprises loading spherical or ellipsoid-shaped coupling elements into respective ones of said passageways or into said passageway having said plurality of passageway portions.

3. The method of claim 2 wherein loading said spherical or ellipsoid shaped coupling elements comprises admitting said spherical or ellipsoid shaped coupling elements into respective conduits formed in said female portion between an outer surface of the female portion and respective ones of said cooperating grooves formed in said opposing cylindrical or tapered complementary surface of said female portion defining respective ones of said passageways or into a conduit formed in said female portion between an outer surface of the female portion and said cooperating groove formed in said opposing cylindrical or tapered complementary surface of said female portion defining said passageway having said plurality of passageway portions.

4. The method of claim 1 wherein said solid mechanical coupling elements are comprised of an insulating material.

5. The method of claim 4 wherein said solid mechanical coupling elements are comprised of ceramic material.

6. The method of claim 1 wherein said opposing cylindrical or tapered complementary surfaces of said male and female portions are spaced apart and define a space between said opposing cylindrical or tapered complementary surfaces of said male and female portions and adjacent each passageway or adjacent said passageway portions of said at least one passageway having said passageway portions and in communication with each passageway or said passageway having said plurality of passageway portions,
    wherein the method further comprises injecting a curable filler material into said space to fill said space to inhibit fluid ingress between said opposing cylindrical or tapered complementary surfaces of said male and female portions and said solid mechanical coupling elements.

7. The method of claim 6 wherein said solid mechanical coupling elements are comprised of an electrically insulating material and wherein said curable filler material includes a thermoplastic electrically insulating material for electrically insulating said male and female portions from each other.

8. The method of claim 1 wherein said cooperating grooves define at least one passageway encircling said common axis and having a varying pitch.

9. The method of claim 1 wherein said cooperating grooves define a plurality of separate passageways encircling said common axis wherein at least two of said separate passageways have a different pitch.

10. The method of claim 1 wherein said cooperating grooves define a plurality of separate passageways encircling said common axis wherein at least two of said separate passageways have opposing pitch.

11. The method of claim 1 wherein said cooperating grooves define a plurality of separate passageways, at least one of said separate passageways being disposed at a right angle to said common axis.

12. The method of claim 1 wherein said cooperating grooves define a plurality of separate passageways, at least one of said separate passageways being aligned with said common axis.

13. The method of claim 1 wherein said cooperating grooves define a plurality of separate passageways, each passageway having at least one portion disposed at a right angle to said common axis.

14. The method of claim 1 wherein said cooperating grooves define a plurality of separate passageways, each passageway having at least one portion aligned with said common axis.

15. The method of claim 1 wherein said cooperating grooves define a plurality of irregularly positioned separate passageways, each said irregularly positioned separate passageway having portions disposed at different angles to said common axis.

16. The method of claim 1 wherein said female portion is a female gap sub member of a downhole bore assembly and wherein said male portion is a male gap sub member of the downhole bore assembly and wherein the method includes positioning an electromagnetic energy transmitter or receiver, within the male and female gap sub members.

17. The method of claim 16 further comprising causing a first contact of said transmitter or receiver to make electrical contact with said female portion of said gap sub member and causing a second contact of said transmitter or receiver to make electrical contact with said male portion of said gap sub member such that said transmitter or receiver can transmit or receive electromagnetic energy through the earth, between said female and male gap sub members and a remotely located receiver or transmitter.

18. A coaxial coupling apparatus comprising
a first body having a male coupling portion;
a second body having a female coupling portion complementary in shape to the male portion;
said male and female portions being aligned axially on a common axis;
said male and female coupling portions having opposing cylindrical or tapered complementary surfaces having respective cooperating grooves that are aligned to form a plurality of passageways or a passageway having a plurality of passageway portions, between said opposing cylindrical or tapered complementary surfaces, at least two of said passageways or at least two of said passageway portions being disposed at different angles to said common axis, each angle being defined between a direction of the common axis and a direction in which one of the at least two of said passageways or one of the at least two of said passageway portions extends; and
a plurality of solid mechanical coupling elements disposed in each passageway of said plurality of passageways or in said passageway having said plurality of passageway portions, such that said each passageway of said plurality of passageways or said passageway having said plurality of passageway portions is substantially full of said solid mechanical coupling elements.

19. The apparatus of claim 18 wherein said solid mechanical coupling elements comprise spherical or ellipsoid-shaped coupling elements in respective ones of said passageways or in said passageway having said plurality of passageway portions.

20. The apparatus of claim 19 further comprising respective conduits formed in said female portion between an outer surface of the female portion and respective said cooperating grooves formed in said opposing cylindrical or tapered complementary surface of said female portion defining respective ones of said passageways or into a conduit formed in said female portion between an outer surface of the female portion and said cooperating groove formed in said opposing cylindrical or tapered complementary surface of said female portion defining said passageway having said plurality of passageway portions.

21. The apparatus of claim 18 wherein said solid mechanical coupling elements are comprised of an insulating material.

22. The apparatus of claim 21 wherein said solid mechanical coupling elements are comprised of ceramic material.

23. The apparatus of claim 18 wherein said opposing cylindrical or tapered complementary surfaces of said male and female portions are spaced apart and define a space between said opposing cylindrical or tapered complementary surfaces of said male and female portions and adjacent each passageway or adjacent said passageway portions of said at least one passageway having said passageway portions, such space being in communication with each passageway or said passageway having said plurality of passageway portions, and wherein the apparatus further comprises a cured filler material in said space to inhibit fluid ingress between said opposing cylindrical or tapered complementary surfaces of said male and female portions and said solid mechanical coupling elements.

24. The apparatus of claim 23 wherein said solid mechanical coupling elements are comprised of an electrically insulating material and wherein said cured filler material includes a thermoplastic electrically insulating material such that said male and female portions are electrically insulated from each other.

25. The apparatus of claim 18 wherein said cooperating grooves define at least one passageway encircling said common axis and having a varying pitch.

26. The apparatus of claim 18 wherein said cooperating grooves define a plurality of separate passageways encircling said common axis wherein at least two of said separate passageways have a different pitch.

27. The apparatus of claim 18 wherein said cooperating grooves define a plurality of separate passageways encircling said common axis wherein at least two of said separate passageways have opposing pitch.

28. The apparatus of claim 18 wherein said cooperating grooves define a plurality of separate passageways, at least one of said separate passageways being disposed at a right angle to said common axis.

29. The apparatus of claim 18 wherein said cooperating grooves define a plurality of separate passageways, at least one of said separate passageways being aligned with said common axis.

30. The apparatus of claim 18 wherein said cooperating grooves define a plurality of separate passageways, each passageway having at least one portion disposed at a right angle to said common axis.

31. The apparatus of claim 18 wherein said cooperating grooves define a plurality of separate passageways, each passageway having at least one portion aligned with said common axis.

32. The apparatus of claim 18 wherein said cooperating grooves define a plurality of irregularly positioned separate passageways, each said irregularly positioned separate passageway having portions disposed at different angles to said common axis.

33. The apparatus of claim 18 wherein said female portion is a female gap sub member of a downhole bore assembly and wherein said male portion is a male gap sub member of a downhole bore assembly and wherein the apparatus further includes an electromagnetic energy transmitter or receiver, in a position such that said transmitter or receiver is positioned within the male and female gap sub members.

34. The apparatus of claim 33 wherein said transmitter or receiver has first and second antenna contacts and wherein said first contact is in electrical contact with said female portion of said gap sub member and wherein said second contact is in electrical contact with said male portion of said gap sub member such that said transmitter or receiver can cause electromagnetic energy to be communicated through the earth, between said female and male gap sub members and a remotely located receiver or transmitter.

\* \* \* \* \*